Sept. 20, 1966 W. P. DYKE ET AL Re. 26,081

SHORT PULSE-HIGH ENERGY FIELD EMISSION TYPE ELECTRON RADIATION TUBE

Original Filed Oct. 22, 1962 2 Sheets-Sheet 1

INVENTORS.
WALTER P. DYKE
FRANK J. GRUNDHAUSER

BY
BUCKHORN, BLORE, KLARQUIST & SPARKMAN
ATTORNEYS

INVENTORS.
WALTER P. DYKE
FRANK J. GRUNDHAUSER
BY
BUCKHORN, BLORE, KLARQUIST & SPARKMAN
ATTORNEYS

United States Patent Office

Re. 26,081
Reissued Sept. 20, 1966

26,081

SHORT PULSE-HIGH ENERGY FIELD EMISSION TYPE ELECTRON RADIATION TUBE

Walter P. Dyke and Frank J. Grundhauser, McMinnville, Oreg., assignors to Field Emission Corporation, McMinnville, Oreg., a corporation of Oregon Original No. 3,173,006, dated Mar. 9, 1965, Ser. No. 232,021, Oct. 22, 1962. Application for reissue July 2, 1965, Ser. No. 472,078

20 Claims. (Cl. 250—49.5)

Matter enclosed in heavy brackets [ ] appears in the original patent but forms no part of this reissue specification; matter printed in italics indicates the additions made by reissue.

This invention relates to an electron radiation device and more particularly to a device by which various substances can be subjected to intense pulses of electron radiation.

It is frequently desirable to determine the biological, chemical of physical effect of radiation such as electron radiation upon various substances, such as living organisms or electronic components. Important factors are the intensity of the radiation or dose rate as well as the time during which the radiation is applied to the substance under test. Previous radiation sources have been limited to relative long pulse lengths of radiation and relative low dose rates. For example such pulse lengths have, in general, been greater than one microsecond and dose rates substantially less than $10^9$ rads per second.

In accordance with the present invention practical electron radiation tubes have been developed in which electrons are emited from a cathode structure at least partly by field emission and are caused to pass at high velocity through a thin walled anode structure and penetrate a substance being treated in a manner which can produce much greater dose rates and shorter pulse lengths of radiation. Thus measured dose rates as high as $2\times10^{13}$ rads per second have been produced with pulse lengths of the order of 0.03 to 0.1 microsecond. In one embodiment of the invention the substance to be subjected to electron radiation is introduced into the interior of a hollow anode structure having a thin metal wall and electrons traveling at high velocity from a cathode structure at least partly surrounding the anode structure are caused to penetrate the wall from a plurality of directions in paths which converge toward such substance. The anode and cathode structures are both supported within an evacuated envelope but access to the interior of the anode structure from the exterior of the envelope is provided so that substance to be treated can be introduced and removed from the anode structure.

The anode structure may be of circular cylindrical shape having its cylindrical wall of thin metal and having one end closed by a metallic end member. The other end may be secured to the end of a metal tube extending through the wall of the envelope to provide both an electrical connection to the anode structure and access to the interior of the radiation chamber provided by such anode structure. The cathode structure may also be of generally circular cylindrical shape and be concentric with and positioned to surround the anode structure. The general type of cathode structure is preferably that of the combined field emission and vacuum arc type employing a plurality of groups of needle points such as shown in the copending application of Walter P. Dyke and Frank J. Grundhauser, Serial No. 114,125, filed June 1, 1961, *now U. S. Patent 3,174,043*, although it may be of the combined thermal and field emission type shown in the copending application of Walter P. Dyke and Frank J. Grundhauser, Serial No. 160,534, filed December 19, 1961, in which a plurality of fine wires extending axially of the cathode structure are employed. In another embodiment of the invention a plurality of end fire tubes each having thin walled anodes forming part of the tube envelope are positioned so that the material to be subjected to electron radiation receive such radiation from a plurality of directions and in paths which converge toward such substance. By directing electrons into such materials from a plurality of directions in accordance with either of the two embodiments of the invention disclosed herein, more uniform irradiation is accomplished and also larger samples can be treated. If it is desired to subject one side only of the material to electron radiation to a limited depth, then a single end fire tube of the type discussed above can be employed.

The electrode structures of either embodiment may be energized by stored energy type of pulsers of the general type shown in the copending application of Walter P. Dyke, Frank J. Grundhauser and Norman W. Stunkard, Serial No. 103,796, filed April 18, 1961, *now U.S. Patent 3,248,574 issued April 26, 1966*. Pulsers of such general type have been developed delivering as high as 2000 amperes at 2 million volts to provide a 4 billion watts discharge for very short periods of time, for example, in squarewave pulses of 0.03 to 0.1 microsecond. The tubes of the present invention are operable with such pulse discharges.

It is therefore an object of the present invention to provide an improved tube structure for subjecting substances to electron radiation.

Another object of the invention is to provide improved electron radiation tubes by which substances to be treated can be subjected to high intensity electron radiation for very short periods of time.

Another object of the invention is to provide an electron radiation device by which a material can be irradiated with electron incident from a plurality of sides of the sample to thereby irradiate the sample more uniformly than if such electrons were incident from one side only and also to enable larger samples to be thus irradiated.

Another object of the invention is to provide a tube structure in which substances to be subjected to electron radiation can be introduced into and removed from a chamber in a thin walled anode structure through an access passageway open to the atmosphere and such substance can be subjected to radiation by high speed electrons penerating the wall of such chamber.

A further object of the invention is to provide an electron radiation tube in which high speed electrons are produced by a high voltage, high current electric discharge in a vacuum at least in part by field emission from a cathode structure and caused to penetrate through the wall of a thin walled anode into a substance to be irradiated.

Other objects and advantages of the invention will appear in the following description of a preferred embodiment shown in the attached drawing of which:

Figure 1:
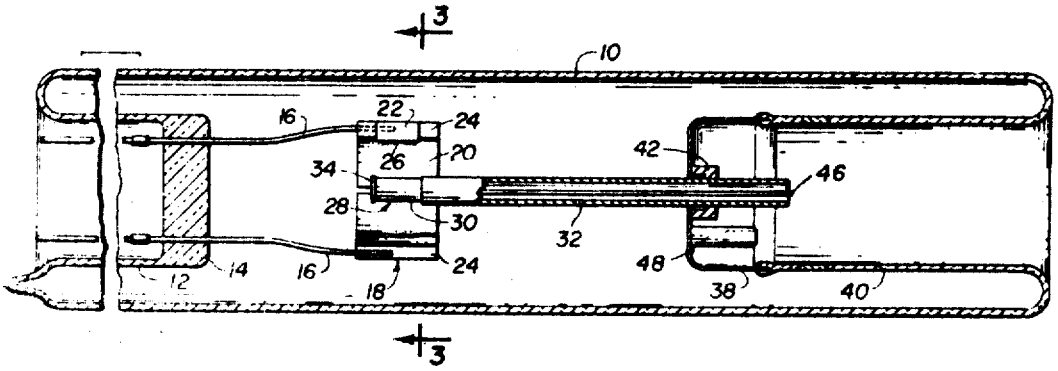
FIG. 1 is a longitudinal sectional view through a tube in accordance with the present invention with the anode structure and part of the cathode structure shown in side elevation.
Figure 2:
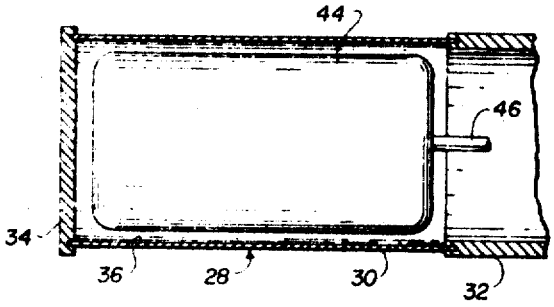
FIG. 2 is a fragmentary longitudinal sectional view on an enlarged scale of the anode structure of FIG. 1.
Figure 3:
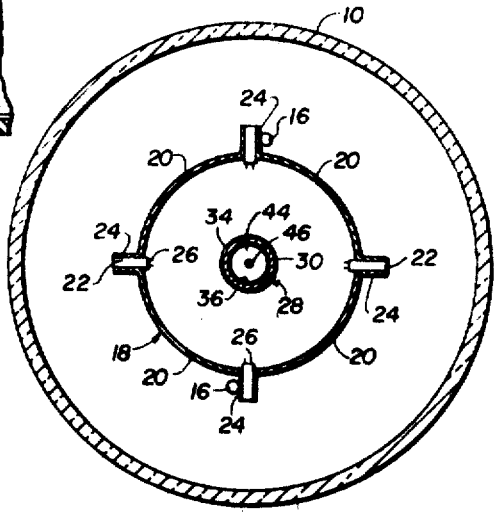
FIG. 3 is a vertical section on an enlarged scale taken on the line 3—3 of FIG. 1.

Referring more particularly to the drawing, the electron radiation tube of FIGS. 1 to 3 includes an evacuated glass envelope 10 of elongated tubular form. The envelope has a reentrant portion 12 at one end terminating at its inner end in a press seal 14, through which a pair of cathode leads 16 also provide support elements for a cathode structure 18.

The cathode structure is shown as being in the form of a hollow open-ended cylindrical member supported coaxially of the envelope 10 and fabricated from four sheet metal arcuate elements 20 and four cathode needle supporting blocks 22. The arcuate elements are circumferentially spaced and each extends somewhat less than 90° around the cylindrical cathode structure. The axially extending edges of the arcuate elements are bent outwardly to provide flanges 24. The needle supporting blocks are rectangular elements elongated axially of the cathode structure and are positioned between adjacent edge flanges 24 of contiguous arcuate elements 20. Such adjacent edge flanges extend parallel to each other and the flanges of each set of adjacent flanges are secured to the opposite sides of one of the needle support blocks in any suitable manner, such as spot welding. Corresponding edge flanges 24 of two diametrically opposed arcuate elements 20 are also each secured to one of the supporting cathode leads 16, for example, by spot welding.

The needle supporting blocks 22 each has a plurality of spaced sharp needle points 26 supported thereon and directed inwardly toward an anode structure 28, also of hollow cylindrical conformation and supported within and coaxial of the cathode structure 18. The needles and their supporting blocks can be fabricated in any of a number of ways and methods of making and supporting such needle points are discussed in the copending application Serial No. 114,125 referred to above. Such needle points may have tip curvatures with radii ranging from $10^{-5}$ to $10^{-3}$ centimeters and may be, for example, spaced 1 to 30 mils apart and may project from their supporting blocks 22 a distance of the order of 50 to 60 mils. The inner or needle supporting portions of the blocks 22 also preferably extend inwardly from the resulting inner circular cylindrical surface of the cathode structure provided by the arcuate elements 20. The result is an electron emitting and electron stream focusing structure which results in large numbers of electrons being emitted from the needle points 26 by combined field emission and vacuum arc action and directed at high velocity to the anode structure 28 when a high voltage pulse from a source capable of supplying a large pulse of current is applied between the cathode structure and anode structure. Ionization of metal vapor from the needle points take place but the high voltage pulse is discontinued before an arc causing removal of metal from the anode element takes place. Metal is thus removed from a few of the needle points on each block 22 during each operation of the tube but sufficient needle points are provided so that the tube is capable of a large number of successive operations.

The anode structure includes a circular cylindrical hollow anode element 30 of thin metal secured at one end to the open end of an anode structure metal support tube 32 to provide for free communication between the interior of the tube 32 and the anode [structure] *element* 30. The other end of the anode element 30 is closed by a metallic disc 34 to provide an anode chamber 36 within the anode element 30.

The anode support tube 32 extends axially of the envelope through a metal cup element 38 which has its peripheral edges sealed into the inner end of another reentrant portion 40 of the envelope 10 at the other end of the envelope from the reentrant portion 12. Such cup member may be made of any one of several known or suitable alloys selected to have a thermal coefficient of expansion close to that of the glass of the reentrant portion 40. A reinforcing collar 42 is positioned within the cup element 38 and around the tube 32. Such cup is secured to the cup 38 and the tube 32 in order to rigidly support the tube and the anode element 28 carried thereby. It will be apparent that the anode chamber 36 is sealed from the vacuum in the envelope 10 but is open to the atmosphere through the tube 32. A container or other holder 44 diagrammatically indicated in FIG. 2 and mounted upon the end of a handle or wire 46 of suitable length and containing or having on its outer surface any suitable substance to be subjected to electron radiation may be inserted into and withdrawn from the anode chamber 36 through the tube 32.

The cup member 38 may also have a suitable anode connector element 48 secured thereto and it will be apparent that electrical connections to a source of high voltage, high current pulses of electrical energy can be made through the anode connector element 48 and the cathode leads 16. It will also be apparent that the usual getter element (not shown) can be connected between the cathode leads 16 and energized during evacuation of the envelope 10.

The tube of the present invention may obviously be made in various sizes but as a specific example, the diameter of the anode element 30 may be 1 cm. and the length 2 cm. Also the wall thickness of such element may be of the order of 1 mil. Such element may be of any one of a number of metals, for example, beryllium, titanium or molybdenum. Each of the cathode needles supporting blocks 22 may, for example, be of copper and be 0.6 inch long and support a number of needle points 26 of the order of 100, such needle points being of tungsten or other metal. Such needle points may, for example, be supported 1.3 cm. from the surface of the anode element 30. The electrons emitted from the needle points are directed toward the anode element in part by the arcuate elements 20 which act as focusing elements so that the beams from the groups of cathode needle points converge toward and strike the anode elements.

Figure 4:
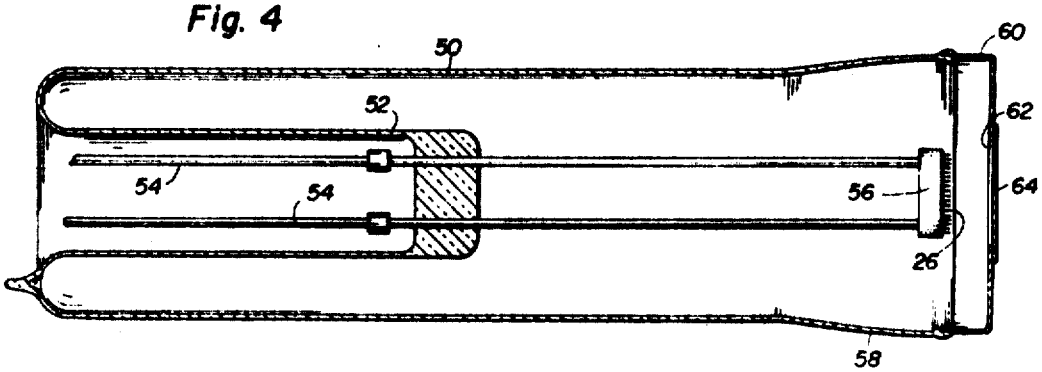
FIG. 4 is a view similar to FIG. 1, showing a modified tube.
Figure 5:
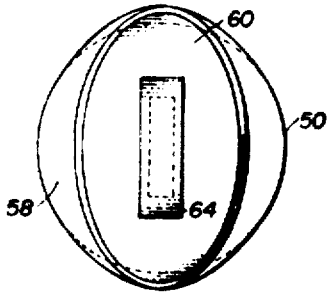
FIG. 5 is an end elevation of the tube of FIG. [1] *4*.
Figure 6:
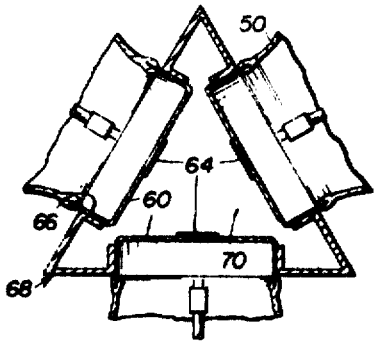
FIG. 6 is a partial sectional view showing how three of the tubes of FIGS. [1 and 2] *4 and 5* may be supported to provide for electron radiation of a material from a plurality of directions.
Figure 7:
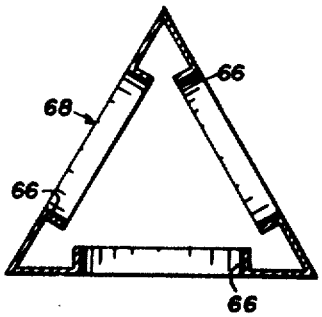
FIG. 7 is a sectional view of the support and anode connector of FIG. 6.
Figure 8:
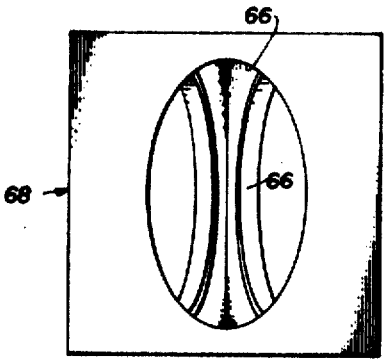
FIG. 8 is a bottom view of the support and connector of FIGS. [7 and 8] *6 and 7*.

The tube shown in FIGS. 4 to 6 includes a tubular glass member 50 forming part of the envelope of the tube and having a reentrant portion 52 at one end into which is sealed a pair of cathode leads 54 which support at their ends within the envelope a cathode needle supporting block 56 of the same general type as the needle supporting blocks 22 described above. The needle supporting block is provided with spaced needle points 26 also of the type discussed above. The needle points 26 of the tube of FIGS. 4 to 6 are however, directed toward the end 58 of the tube opposite the reentrant portion 52.

The end 58 of the glass tubular member 50 is flattened into an elongated oval and is sealed to an oval-shaped envelope closure cup 60 of a suitable metal having a thermal coefficient of expansion similar to that of the glass of the end 58. The closure cap 60 has a rectangular opening 62 therein in alignment with the needle points 26. The opening 62 is closed by a window 64 of thin metal, such as one of the metals discussed above with respect to the anode element 30 of FIGS. 1 to 3. The window 64 provides an anode element and may be of the same or even lesser thickness than the anode element 30 of FIGS. 1 to 3.

A plurality of the tubes shown in FIGS. 4 and 5 may be supported with their anode or cap ends adjacent each other, for example, by inserting the caps 60 of three of such tubes into oval flanged sockets 66 formed in the three sides of a sheet metal support and anode connector element 68. The sockets 66 receive and fit the caps 60. It will be apparent that the tubes of FIG. 6 will be operated in parallel and that suitable cathode and anode connections will be provided. The material to be irradiated by electrons will be positioned in the anode chamber 70 provided in the anode structure formed by the anode ends of the tubes. Such material may be supported in suitable thin walled containers or, if the nature of the substance permits, the material may be supported on one of the envelope closures provided by a cap 60 and window 64 without the use of a special container for the material.

It is apparent that the high dosage rates of radiation referred to above require high electron beam current densities, for example, of the order of 500 amperes per square centimeter, and that even at pulse lengths of 0.1 microsecond or shorter there is considerable heating of the anode elements. This heating increases *with* the density of the metal employed, for example, the heating due to such electron beams traversing a 0.001 inch molybdenum element once only, will cause the temperature of such element to rise to 400° C. For a lesser density material such as beryllium, such temperature is less than 100° C. The upper limiting factor for the high voltage electron beam current is thus the heating which is produced when a particular metal is employed for the anode element and the temperature which such metal will withstand without destruction of the anode element 28. The temperature which the particular material being treated can withstand is of course another limiting factor.

It will also be apparent from the preceding discussion that a portion of the energy of the high speed electrons is lost by inelastic collision with atoms of the metal of the anode element during passage through such anode element and, in fact, all of such electrons do not pass through such element. For example, the molybdenum the number of electrons having an initial energy of 600,000 electron volts passing through an anode element of 1 mil thickness is approximately 83 percent and the residual energies of the electrons which do pass through range between 550,000 and 570,000 electron volts. Elements having lower atomic numbers than molybdenum transmit a greater number of electrons for the same thickness of the anode element and with less decrease in the energies of the transmitted electrons. The materials treated in the anode chamber are thus not subjected to a truly monoenergic beam of electrons but this is not possible in any event, since an energy spread is produced as soon as the electrons penetrate such substance. Since the electrons reach the substance being treated from several directions, the uniformity of treatment of such substance is greater than in previous systems, employing a beam of electrons from one direction only.

While we have disclosed a preferred embodiment of the invention, it is intended that the scope of the invention should not be limited to the details of such specific embodiment.

We claim:

1. An electron radiation device comprising envelope means having a vacuum therein, an anode structure forming part of said envelope means, said anode structure having a thin metallic wall portion capable of being penetrated by high speed electrons, electron emitting means supported in said envelope means including a field emission cathode for directing electrons toward said wall portion when a high voltage pulse is applied between said anode and said cathode, means for supporting material to be subjected to electron radiation adjacent and on the other side of said wall portion from said electron emitting means, an electrical connecting means for said electron emitting means and said anode structure to enable high voltage, high current electric discharges to be produced between said electron emitting means and said anode structure to cause electrons to penetrate said wall and into said material.

2. An electron radiation device comprising envelope means having a vacuum therein, an anode structure forming part of said envelope means, said anode structure providing a hollow chamber open to the atmosphere for receiving material to be subject to electron radiation and having a plurality of thin wall portions located around said chamber, a plurality of electron emitting means each including at least one field emission cathode and supported in said envelope means for directing electrons toward said wall portions, when a high voltage pulse is applied between said anode structure and the cathodes of said electron emitting means, an electrical connecting means for said electron emitting means and said anode structure to enable high voltage, high current electric discharges to be produced between said electron emitting means and said anode structure to cause electrons to penetrate said wall portions and into said material from a plurality of directions.

3. An electron radiation device comprising envelope means having a vacuum therein, an anode structure forming part of said envelope means, said anode structure providing a hollow chamber open to the atmosphere for receiving material to be subject to electron radiation and having a plurality of thin wall portions spaced around said chamber, a plurality of electron emitting means each including at least one field emission cathode supported in said envelope means for directing electrons toward said wall portions, when a high voltage pulse is applied between said anode structure and said electron emitting means, means for applying high voltage pulse between said electron emitting means and said anode structure to enable high voltage, high current electric discharges to be produced between said electron emitting means and said anode structure to cause electrons to penetrate said wall portions and into said material from a plurality of directions, said envelope means including a plurality of separate envelopes each having one of said thin wall portions at one end thereof and each containing at least one of said electron emitting means, and said anode structure including means for supporting said plurality of envelopes with their ends having said thin wall portions adjacent each other.

4. An electron radiation device comprising:

envelope means having a vacuum therein, an anode structure supported by said envelope means, said anode structure providing a hollow chamber having its interior sealed from said vacuum and open to the atmosphere, and having a thin metallic wall capable of being penetrated by high speed electrons to provide an electron radiation chamber, a field emission cathode structure supported in said envelope means and having electron emitting means for directing electrons toward said wall when a high voltage pulse is applied between said anode and cathode structures, means providing access to the interior of said chamber from the exterior of said envelope means without affecting said vacuum to enable the introduction into and removal from said chamber of a material to be subject to electron radiation, and means for applying high voltage pulses between said anode and cathode structure to enable high voltage, high current pulse electric discharges to be produced by combined field emission and vacuum arc operation between said cathode and anode structures to cause electrons to penetrate said wall and into said material.

5. An electron radiation tube comprising:
an envelope having a vacuum therein,
an anode structure supported in said envelope,
said anode structure including a hollow member having its interior sealed from said vacuum to provide a chamber within said member and having a thin metallic wall surrounding said chamber capable of being penetrated by high speed electrons,
a field emission cathode structure supported in said envelope and at least partly surrounding said anode structure and having electron emitting means in the form of a plurality of spaced needles for directing electrons toward said wall when a high voltage pulse is applied between said anode and cathode structures,
means providing access to the interior of said chamber from the exterior of said envelope without affecting said vacuum to enable the introduction into and removal from said chamber of a material to be subject to electron radiation;
and electrical connection means extending from the exterior of said envelope to said anode and cathode structures to enable high voltage, high current pulse electric discharges to be produced between said cathode and anode structures to cause electrons to penetrate said wall and into said material.

6. An electron radiation tube comprising:
an envelope having a vacuum therein,
an anode structure supported within said envelope,
said anode structure including a hollow cylindrical member having its interior sealed from said vacuum to provide a chamber within said member and having a thin metallic cylindrical wall surounding said chamber capable of being penetrated by high speed electrons,
a plurality of field emission cathode structures supported in said envelope and at least partly surrounding said anode structure and having electron emitting means for directing electrons toward said wall from a plurality of directions when a high voltage pulse is applied between said anode and cathode structures,
means providing access to the interior of said chamber from the exterior of said envelope without affecting said vacuum to enable the introduction into and removal from said chamber of a material to be subject to electron radiation,
and electrical connection means extending from the exterior of said envelope to said anode and cathode structures to enable high voltage, high current pulse electric discharges to be produced between said cathode and anode structures to cause electrons to penetrate said wall and into said material.

7. An electron radiation tube comprising:
an envelope having a vacuum therein,
an anode structure supported within said envelope,
said anode structure including a hollow cylindrical member having its interior sealed from said vacuum and having a thin metallic cylindrical wall capable of being penetrated by high speed electrons to provide an electron radiation chamber,
a cathode structure supported in said envelope and extending around said anode structure and having electron emitting means spaced radially from and circumferentially around said member for directing electrons by field emission toward said wall from a plurality of directions when a high voltage pulse is applied between said anode and cathode structures,
means for introducing material into the interior of said chamber from the exterior of said envelope without affecting said vacuum and for removing said material from said chamber to subject it to electron radiation,
and electrical connection means extending from the exterior of said envelope to said anode and cathode structures to enable high voltage, high current pulse electric discharges to be produced between said cathode and anode structures to cause electrons to penetrate said wall and into said material.

8. An electron radiation tube comprising:
an elongated envelope having a vacuum therein,
an anode structure supported in said envelope and having its interior sealed from said vacuum,
said anode structure including an elongated hollow member extending axially of said envelope and having a thin metallic wall capable of being penetrated by high speed electrons to provide an electron radiation chamber,
a cathode structure supported in said envelope and having electron emitting means for directing electrons by field emission toward said wall when a high voltage pulse is applied between said anode and cathode structures,
means providing access into said chamber without affecting said vacuum including a hollow metallic tube extending axially of said envelope and opening into one end of said chamber and to the exterior of said envelope to enable the introduction into and removal from said chamber of a material to be subject to electron radiation,
and electrical connection means extending from the exterior of said envelope to said anode and cathode structures to enable high voltage, high current pulse electric discharges to be produced between said cathode and anode structures to cause electrons to penetrate said wall and into said material.

9. An electron radiation tube comprising:
an elongated envelope having a vacuum therein,
an anode structure supported in said envelope and including a hollow cylindrical member having its interior sealed from said vacuum,
said anode structure having its cylindrical axis extending axially of said envelope and having a thin metallic cylindrical wall capable of being penetrated by high speed electrons to provide an electron radiation chamber,
a hollow cathode structure supported in said envelope and surrounding said anode structure,
said cathode structure having electron emitting means circumferentially disposed around said anode structure for directing electrons by field emission toward said wall when a high voltage pulse is applied between said anode and cathode structures,
means providing access into said chamber without affecting said vacuum including a hollow metallic tube extending axially of said envelope and opening into an end of said chamber and to the exterior of said envelope to enable the introduction into and removal from said chamber of a material to be subject to electron radiation,
and electrical connection means including said tube extending from the exterior of said envelope to said anode and cathode structures to enable high voltage, high current pulse electric discharges to be produced between said cathode and anode structures to cause electrons to penetrate said wall and into said material.

10. An electron radiation tube comprising:
an elongated envelope having a vacuum therein and having reentrant ends,
an anode structure in said envelope and including a hollow cylindrical member extending axially of said envelope,
said anode structure having its interior sealed from said vacuum and having a thin metallic cylindrical wall capable of being penetrated by high speed electrons to provide an electron radiation chamber,
a field emission cathode structure in said envelope and surrounding said anode structure and having electron emitting means disposed circumferentially around said anode structure for directing electrons toward said wall when a high voltage pulse is applied between said anode and cathode structures, means for supporting said anode and providing access into said chamber including a hollow metallic tube extending axially of said envelope and opening into an end of said chamber and to the exterior of said envelope to enable the introduction into and removal from said chamber of a material to be subject to electron radiation, said tube being supported by and opening through the inner portion of one of said reentrant ends of said envelope, and electrical connection means including said tube extending from the exterior of said envelope to said anode and cathode structures to enable high voltage, high current pulse electric discharges to be produced between said cathode and anode structures to cause electrons to penetrate said wall and said material, said connection means also including leads extending through the inner portion of the other of said reentrant ends of said envelope and supporting said cathode structure.

11. An electron radiation tube comprising:

an envelope having a vacuum therein, an anode structure supported in said envelope, said anode structure including a hollow member having its interior sealed from said vacuum and having a thin metallic wall capable of being penetrated by high speed electrons to provide an electron radiation chamber, a field emission cathode structure supported in said envelope and having electron emitting means for directing electrons toward said wall when a high voltage pulse is applied between said anode and cathode structures, said electron emitting means including a plurality of needle points directed toward said wall from a plurality of sides of said anode structure, means providing access to the interior of said chamber from the exterior of said envelope without affecting said vacuum to enable the introduction into and removal from said chamber of a material to be subject to electron radiation, and electrical connection means extending from the exterior of said envelope to said anode and cathode structures to enable high voltage, high current pulse electric discharges to be produced between said cathode and anode structures to cause electrons to penetrate said wall and into said material.

12. An electron radiation tube comprising:

an envelope having a vacuum therein, an anode structure supported in said envelope, said anode structure including a hollow cylindrical member having its interior sealed from said vacuum and having a thin metallic cylindrical wall capable of being penetrated by high speed electrons to provide an electron radiation chamber, a cathode structure including a hollow cylindrical member supported in said envelope and concentric with and surrounding said anode structure, electron emitting means including a plurality of electron emitting elements supported within and spaced circumferentially of said hollow cylindrical member of said cathode structure, said electron emitting elements each including a plurality of field emission cathodes in the form of spaced needle points directed toward said wall, means to provide access to the interior of said chamber from the exterior of said envelope without affecting said vacuum to enable the introduction into and removal from said chamber of a material to be subject to electron radiation, and electrical connection means extending from the exterior of said envelope to said anode and cathode structures to enable high voltage, high current pulse electric discharges to be produced between said cathode and anode structures to cause electrons to penetrate said wall and said material.

*13. An electron radiation apparatus, comprising:*

*a diode electron radiation tube having an evacuated envelope containing no significant amount of free gas,*

*an anode structure forming part of said envelope and having a thin wall portion transparent to high speed electrons,*

*a field emission cathode structure supported within said envelope and including at least one sharpened emitting element directed toward said wall portion, and*

*pulser means for applying high voltage, high current pulses between said cathode structure and said anode structure to cause electrons to be emitted from said emitting element at least in part by field emission initiated by the electrical field produced between the anode wall portion and the emitting element and to be transmitted through said wall portion out of said envelope,*

*said envelope having a dielectric portion separating said anode structure from said cathode structure so that the spacing between said emitting element and said wall portion is less than one half of the distance along the surface of said dielectric portion between said structures.*

*14. An electron radiation apparatus, comprising:*

*a diode electron radiation tube having an evacuated envelope containig no significant amount of free gas,*

*an anode structure attached to a dielectric portion of the envelope to form another part of said envelope and having a thin wall portion transparent to high speed electrons,*

*a field emission cathode structure supported within said envelope and including a plurality of spaced sharpened emitting elements of electrical conducting material directed toward said wall portion and spaced from said wall portion by less than one-half the distance along the surface of a dielectric portion of said envelope separating said anode and cathode structures, and*

*pulser means for applying high voltage, high current pulses between said cathode structure and said anode structure to cause electrons to be emitted from said emitting elements at least in part by field emission initiated by the electrical field produced between the anode structure and the emitting elements and to be transmitted through said wall portion out of said envelope.*

*15. An electron radiation apparatus, comprising:*

*a diode electron radiation tube having an evacuated envelope,*

*an anode structure forming part of said envelope and having a thin wall portion transparent to high speed electrons,*

*a field emission cathode structure supported within said envelope electrically insulated from the anode structure and including a plurality of spaced sharpened emitting elements directed toward said wall portion, and*

*pulse generator means for applying high voltage, high current pulses between said cathode structure and said anode structure to cause electrons to be emitted from said emitting elements at least in part by field emission initiated by the electrical field produced between the anode and cathode structures and to be transmitted through said wall portion out of said envelope,*

*said means applying pulses of sufficient intensity to vaporize a portion of at least one of said emitting elements to produce ions of vaporized cathode material within said envelope which cause a vacuum arc*

*to be formed between the cathode emitting element and said anode structure to greatly increase the current flow through said wall portion.*

*16. An electron radiation device, comprising:*

*a diode electron radiation tube having an evacuated envelope,*

*an anode structure forming part of said envelope and having a thin wall portion transparent to high speed electrons,*

*a field emission cathode structure supported within said envelope and including at least one sharpened needle shaped emitting element having a tip with radius of curvature less than $10^{-3}$ centimeter directed toward said wall portion, and*

*pulser means for applying high voltage, high current pulses between said cathode structure and said anode structure to cause electrons to be emitted from said emitting element at least in part by field emission initiated by the voltage applied between the anode and cathode structures and to be transmitted through said wall portion out of said envelope,*

*said envelope having a dielectric portion extending continuously between the connection means of said anode structure and the connection means of said cathode structure.*

*17. An electron radiation device, comprising:*

*an evacuated envelope,*

*a diode electron radiation tube having an anode structure forming part of said envelope and having a thin, flat wall portion transparent to high speed electrons,*

*a field emission cathode structure supported within said envelope electrically insulated from the anode structure and including a plurality of spaced sharpened needle shaped emitting elements of refractory metal directed toward said wall portion and having their pointed ends separated from each other by free space, and*

*pulser means for applying high voltage, high current pulses between said cathode structure and said anode structure to cause electrons to be emitted from said emitting elements at least in part by field emission initiated by the electrical field produced between the anode structure and the emitting elements and to be transmitted through said wall portion out of said envelope.*

*18. An electron radiation device, comprising:*

*a diode electron radiation tube having an evacuated envelope,*

*an anode structure forming part of said envelope and having a thin wall portion transparent to high speed electrons,*

*a field emission cathode structure supported within said envelope electrically insulated from the anode structure and including a plurality of spaced sharpened needle shaped emitting elements of metal directed toward said wall portion and having their pointed ends separated from each other by free space, and*

*pulser means for applying high voltage, high current pulses between said cathode structure and said anode structure to cause electrons to be emitted from said emitting elements at least in part by field emission initiated by the voltage applied between the anode and cathode structures and to be transmitted through said wall portion out of said envelope,*

*said means applying pulses of sufficient intensity to vaporize a portion of at least one of said emitting elements to produce ions of vaporized cathode material within said envelope which cause a vacuum arc to be formed between the cathode emitting element and said anode structure to greatly increase the current flow through said window portion.*

*19. An electron radiation apparatus, comprising:*

*a diode electron radiation tube having an evacuated envelope containing no significant amount of gas,*

*an anode forming part of said envelope and having a thin window portion transparent to high speed electrons,*

*a field emission cathode of metal supported within said envelope in spaced insulated relationship to said anode, said cathode having at least one sharpened emitting portion directed toward said window portion, and*

*pulser means for applying high voltage, high current pulses between said cathode and said anode to cause electrons to be emitted from said emitting portion of said cathode at least in part by field emission initiated by the electrical field produced between the anode and said emitting portion and transmitted through said window portion out of said envelope.*

*20. An electron radiation apparatus, comprising:*

*a diode electron radiation tube having an evacuated envelope containing no significant amount of gas,*

*an anode forming part of said envelope and having a thin window portion transparent to high speed electrons,*

*a field emission cathode of metal supported within said envelope in spaced insulated relationship to said anode, said cathode having at least one sharpened emitting portion directed toward said window portion, and*

*pulser means for applying high voltage, high current pulses between said cathode and said anode to cause electrons to be emitted from said emitting portion of said cathode at least in part by field emission initiated by the electrical field produced between the anode and said emitting portion and transmitted through said window portion out of said envelope,*

*said means applying pulses of sufficient intensity to vaporize a portion of said cathode to produce ions of vaporized cathode metal within said envelope which cause a vacuum arc to be formed between said cathode and said anode to greatly increase the current flow through said window portion.*

References Cited by the Examiner

The following references, cited by the Examiner, are of record in the patented file of this patent or the original patent.

UNITED STATES PATENTS

| | | | |
|---|---|---|---|
| 897,279 | 9/1908 | Fressenden. | |
| 1,385,121 | 7/1921 | Elliott. | |
| 1,970,532 | 8/1934 | Bouwers. | |
| 2,724,059 | 11/1955 | Gale | 250—49.5 |
| 2,817,002 | 12/1957 | Dyke et al. | 313—309 X |
| 2,907,704 | 10/1959 | Trump. | |

RALPH G. NILSON, *Primary Examiner.*

W. F. LINDQUIST, *Assistant Examiner.*